United States Patent
Reed et al.

(10) Patent No.: US 10,452,749 B2
(45) Date of Patent: Oct. 22, 2019

(54) PREDICTABLE ORGANIC TILE LAYOUT

(71) Applicant: Microsoft Technology Licensing, LLC, Redmond, WA (US)

(72) Inventors: Lynnette Reed, Bellevue, WA (US); John E. Churchill, Monroe, WA (US); Alexandra Cabral, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/226,658

(22) Filed: Mar. 26, 2014

(65) Prior Publication Data

US 2015/0278994 A1    Oct. 1, 2015

(51) Int. Cl.
*G06F 17/21* (2006.01)
*G06T 11/60* (2006.01)
*G06F 3/0481* (2013.01)

(52) U.S. Cl.
CPC .......... *G06F 17/212* (2013.01); *G06F 3/0481* (2013.01); *G06T 11/60* (2013.01)

(58) Field of Classification Search
CPC .. G06F 3/04845; G06F 17/212; G06F 17/211; G06F 3/0482; G06F 3/04842; G06F 3/04888; G06F 3/0485; G06F 3/0481; G06F 19/26; H04L 67/025; G06T 11/60; G06T 1/00; G06T 19/00; G06T 11/206; G06T 2200/32; G06T 2200/28; G06T 3/4038
USPC ....... 345/660, 659, 677, 418, 672, 684, 440, 345/619, 440.2, 680; 715/243, 244, 715/739–740, 792, 810, 245, 246, 716, 715/744, 763, 764, 788, 866; 348/14.03, 348/14.07
See application file for complete search history.

(56) References Cited

U.S. PATENT DOCUMENTS

| 5,712,995 | A | 1/1998 | Cohn |
| 7,412,647 | B2 * | 8/2008 | Sellers ................. G06F 17/217 715/243 |
| 7,765,490 | B2 | 7/2010 | Lai et al. |
| 2004/0187078 | A1 * | 9/2004 | Girgensohn ............ G06T 11/60 715/246 |
| 2005/0195217 | A1 * | 9/2005 | Robertson ............. G06F 3/0481 345/619 |

(Continued)

FOREIGN PATENT DOCUMENTS

| CN | 1512301 A | 7/2004 |
| CN | 2791785 Y | 6/2006 |

(Continued)

OTHER PUBLICATIONS

Tavarageri, Sanket et al., "Dynamic Selection of Tile Sizes", 18th International Conference on High Performance Computing (HiPC), Dec. 2011, 10 pages.

(Continued)

*Primary Examiner* — Chante E Harrison
(74) *Attorney, Agent, or Firm* — Alleman Hall Creasman & Tuttle LLP (57) ABSTRACT

Each of a plurality of ordered tiles is sequentially fit into a first open location within a scrollable two-dimensional matrix. The open locations into which any particular tile may be fit are limited by a non-zero, positive offset value that specifies how far from an immediately previous tile that tile may be backfilled into the matrix.

20 Claims, 8 Drawing Sheets

(56) References Cited

U.S. PATENT DOCUMENTS

| | | | |
|---|---|---|---|
| 2009/0089660 A1* | 4/2009 | Atkins | G06F 9/4443 |
| | | | 715/243 |
| 2009/0132942 A1 | 5/2009 | Santoro et al. | |
| 2010/0281402 A1 | 11/2010 | Staikos et al. | |
| 2011/0074824 A1* | 3/2011 | Srinivasan | G06F 3/04883 |
| | | | 345/660 |
| 2012/0162266 A1 | 6/2012 | Douglas et al. | |
| 2012/0226971 A1* | 9/2012 | Tocchini | G06F 17/30905 |
| | | | 715/243 |
| 2012/0311474 A1 | 12/2012 | McPherson et al. | |
| 2013/0057587 A1* | 3/2013 | Leonard | G06F 3/0488 |
| | | | 345/672 |
| 2013/0067412 A1 | 3/2013 | Leonard et al. | |
| 2013/0187866 A1* | 7/2013 | Kim | G06F 3/0488 |
| | | | 345/173 |
| 2013/0227476 A1* | 8/2013 | Frey | G06F 3/0488 |
| | | | 715/810 |
| 2013/0239030 A1* | 9/2013 | Cunningham | G06F 3/0481 |
| | | | 715/764 |
| 2014/0013271 A1* | 1/2014 | Moore | G06F 3/0482 |
| | | | 715/792 |
| 2014/0149860 A1* | 5/2014 | Wilder | G06F 3/04886 |
| | | | 715/716 |
| 2014/0164938 A1* | 6/2014 | Petterson | G06F 3/0482 |
| | | | 715/739 |
| 2014/0337747 A1* | 11/2014 | Koon | H04L 67/025 |
| | | | 715/740 |
| 2014/0368547 A1* | 12/2014 | Elings | G06T 3/60 |
| | | | 345/659 |
| 2015/0089355 A1* | 3/2015 | Peng | G06F 17/212 |
| | | | 715/244 |
| 2015/0109342 A1* | 4/2015 | Ohki | G06F 17/30058 |
| | | | 345/660 |
| 2015/0141139 A1* | 5/2015 | Trombetta | H04N 5/76 |
| | | | 463/31 |
| 2017/0249076 A1* | 8/2017 | Smith | G06F 3/04847 |
| 2017/0322694 A1* | 11/2017 | Cohen | G06F 3/0485 |
| 2018/0027047 A1* | 1/2018 | Koon | G06F 17/30905 |

FOREIGN PATENT DOCUMENTS

| | | |
|---|---|---|
| CN | 102298481 A | 12/2011 |
| CN | 102508599 A | 6/2012 |
| CN | 102915319 A | 2/2013 |

OTHER PUBLICATIONS

Cohen, E. et al., "Constraint Based Tiled Windows," IEEE Computer Graphics and Applications, vol. 6, No. 5, May 1, 1986, 12 pages.

ISA European Patent Office, International Search Report and Written Opinion Issued in Application No. PCT/US2015/021917, dated Jul. 24, 2015, WIPO, 13 Pages.

IPEA European Patent Office, Second Written Opinion Issued in Application No. PCT/US2015/021917, dated Feb. 25, 2016, WIPO, 5 Pages.

IPEA European Patent Office, International Preliminary Report on Patentability Issued in PCT Application No. PCT/US2015/021917, dated Jun. 3, 2016, WIPO, 9 pages.

"First Office Action and Search Report Issued in Chinese Patent Application No. 2015800163336", dated Dec. 18, 2018, 14 Pages.

* cited by examiner

|        | X | X-F | Y | FIT? |
|--------|---|-----|---|------|
| TILE A | 0 | 0   | 0 | A FITS |
|        |   |     |   |      |
| TILE B | 0 | -3  | 0 | SPECIAL INCREMENT/ EXCEEDS BOUNDARY |
|        | 0 | -3  | 1 | EXCEEDS BOUNDARY |
|        | 0 | -3  | 2 | EXCEEDS BOUNDARY |
|        | 1 | -2  | 0 | EXCEEDS BOUNDARY |
|        | 1 | -2  | 1 | EXCEEDS BOUNDARY |
|        | 1 | -2  | 2 | EXCEEDS BOUNDARY |
|        | 2 | -1  | 0 | EXCEEDS BOUNDARY |
|        | 2 | -1  | 1 | EXCEEDS BOUNDARY |
|        | 2 | -1  | 2 | EXCEEDS BOUNDARY |
|        | 3 | 0   | 0 | OCCLUDED |
|        | 3 | 0   | 1 | OCCLUDED |
|        | 3 | 0   | 2 | OCCLUDED |
|        | 4 | 1   | 0 | B FITS |
|        |   |     |   |      |
| TILE C | 1 | -2  | 0 | SPECIAL INCREMENT/ EXCEEDS BOUNDARY |
|        | 1 | -2  | 1 | EXCEEDS BOUNDARY |
|        | 1 | -2  | 2 | EXCEEDS BOUNDARY |
|        | 2 | -1  | 0 | EXCEEDS BOUNDARY |
|        | 2 | -1  | 1 | EXCEEDS BOUNDARY |
|        | 2 | -1  | 2 | EXCEEDS BOUNDARY |
|        | 3 | 0   | 0 | OCCLUDED |
|        | 3 | 0   | 1 | OCCLUDED |
|        | 3 | 0   | 2 | OCCLUDED |
|        | 4 | 1   | 0 | OCCLUDED |
|        | 4 | 1   | 1 | OCCLUDED |
|        | 4 | 1   | 2 | OCCLUDED |
|        | 5 | 2   | 0 | OCCLUDED |
|        | 5 | 2   | 1 | OCCLUDED |
|        | 5 | 2   | 2 | OCCLUDED |
|        | 6 | 3   | 0 | C FITS |
|        |   |     |   |      |
| TILE D | 3 | 0   | 0 | SPECIAL INCREMENT/ OCCLUDED |
|        | 3 | 0   | 1 | D FITS |

FIG. 5

PREDICTABLE ORGANIC TILE LAYOUT

BACKGROUND

A computing device may include a user interface that utilizes graphical tiles to provide access to computing objects. For example, graphical tiles may be used to represent media items, applications, contacts, settings, or virtually any other computing objects. User interfaces with graphical tiles may improve the user experience by allowing a user to quickly recognize and select desired objects. The computing device may present the tiles in a variety of formats.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of fitting a plurality of ordered tiles into a scrollable two-dimensional matrix is disclosed. The method includes sequentially fitting each tile into a first open location within the matrix. The open locations into which any particular tile may be fit are limited by a non-zero, positive offset value that specifies how far from an immediately previous tile that tile may be backfilled into the matrix.

DETAILED DESCRIPTION

An automated method of fitting a plurality of ordered tiles of varying sizes in a scrollable two-dimensional matrix is disclosed. Each tile includes data describing the size and shape of the tile, as well as that tile's order relative to other tiles. Each tile may be placed within the two-dimensional matrix from a lowest-ordered tile to a highest-ordered tile. As each tile is placed within the two-dimensional matrix, the placement location of that tile is used to determine the beginning location for fitting the next tile. The fitting of each successive tile proceeds through the two-dimensional matrix in a defined direction until the tile is placed in a first open location. The method repeats for each of the plurality of ordered tiles until the highest ordered tile of the plurality of ordered tiles is placed within the two-dimensional matrix.

Figure 1:
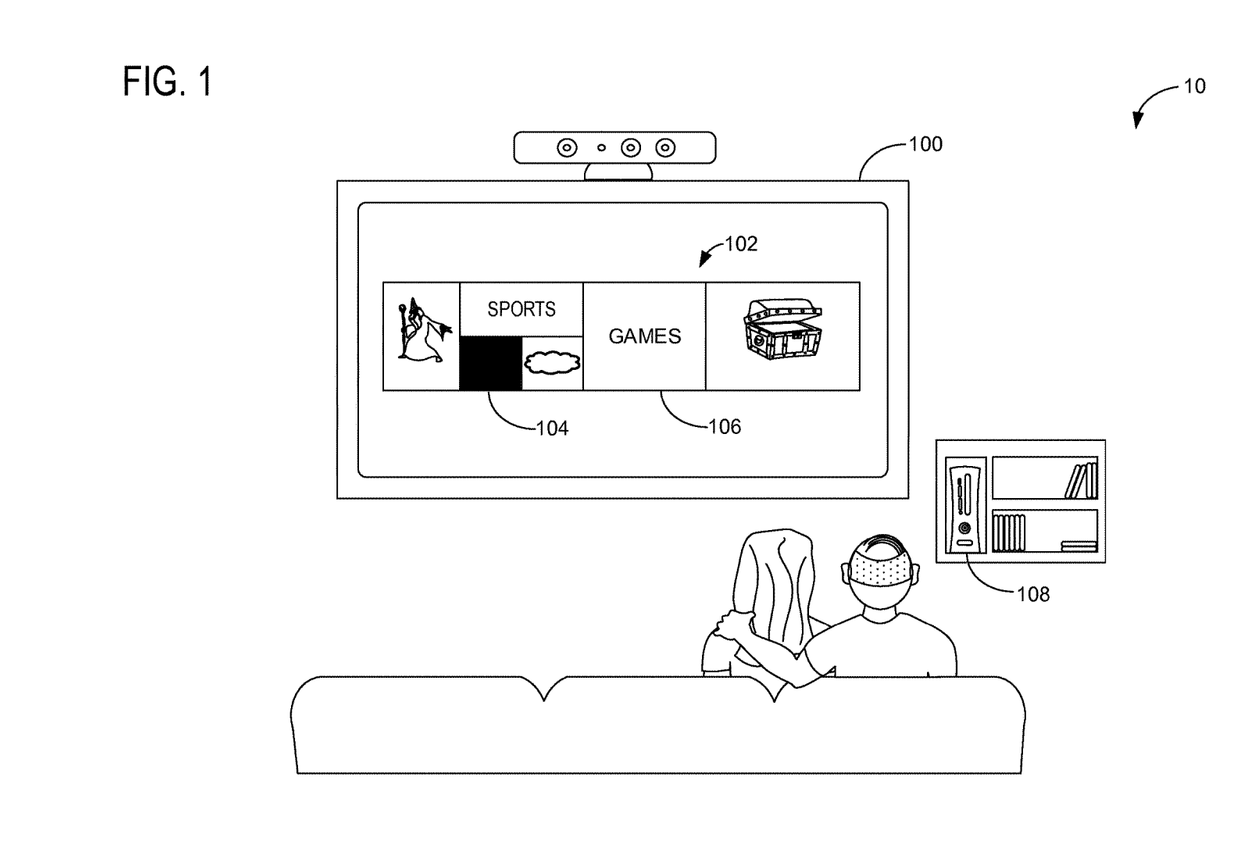
FIG. 1 shows an entertainment system displaying an example scrollable two-dimensional matrix of tiles in accordance with an embodiment of the present disclosure.

FIG. 1 illustrates an exemplary entertainment system 10 including a display device 100 displaying a matrix of graphical tiles 102 generated by computing system 108. Matrix of graphical tiles 102 is composed of a plurality of graphical tiles 106. Graphical tiles 106 are graphics-based representations of computing objects. Matrix 102 may include one or more empty locations 104 where no tiles are fit.

Various properties of matrix 102 may affect the user experience. For example, a relatively large number of empty locations 104 within matrix 102 may prove distracting to a user. Also, empty locations that are on a boundary of the matrix, adjacent to one another, or have other specific location characteristics may be undesirable. Furthermore, a perceived random order of graphical tiles 106 within matrix 102 may further degrade the user experience. As such, the herein described placement strategy may strategically improve the properties of matrix 102.

FIGS. 2A, 2B, 2C, and 2D schematically show fitting a plurality of ordered tiles in a horizontally scrollable two-dimensional matrix. The horizontally scrollable two-dimensional matrix may be composed of a plurality of columns and a plurality of rows. The number of rows defines the boundaries of the matrix vertically. The starting column defines a left-side, on-screen boundary in the horizontal direction. The columns and rows may be identified in any suitable manner. For the purpose of this non-limiting example, the rows of matrix 200 are numbered from 0 to 2 beginning with the uppermost row. The columns are likewise numbered from 0 to 6 beginning with the leftmost column. Because matrix 200 is horizontally scrollable, it is to be understood that columns numbered 7 and above may be accessible via horizontal scrolling. Further, as discussed below, a matrix may be vertically scrollable.

Within the scrollable matrix, each of the plurality of tiles may represent media items, applications, contacts, settings, or virtually any other computing object. Furthermore, the plurality of tiles may include tiles of two or more sizes. Thus, each of the plurality of ordered tiles may include size data defining a width and a height of the tile. Each tile may be sized to completely fill one or more columns and one or more rows. As the area of a tile may include multiple columns and rows, the leftmost column and uppermost row filled by the tile may be used to describe the location of the tile area within the matrix. The size of a tile may be static or derived from frequency of use, chronologically by date of last use (e.g., more recently used tiles larger than less recently used tiles), and/or based on other suitable factors.

In addition to size data, each of the plurality of tiles may also include order data. The order data for each of the plurality of tiles may be used to dictate the order of placement of each tile within the matrix. Each tile may be assigned an order by the computing object represented by the tile, an operating system, an application, and/or a remote service. As discussed above with reference to the size of a tile, the order of a tile may also be static or derived from one or more of a frequency of use, chronologically by date of last use, chronologically by date of installation, chronologically based on metadata (e.g., album publication date), or any other suitable factors.

The scrolling matrix and the plurality of ordered tiles may be components of a graphical user interface of an operating system, an application, or a remote service, for example. Periodically, the properties of the scrolling matrix, composition of the plurality of ordered tiles, and/or the size and order of each tile within the plurality of ordered tiles may be updated.

As shown in FIGS. 2A-2D, the plurality of ordered tiles may be placed into the two-dimensional scrollable matrix according to the order of each tile. After placing each tile within the matrix, the method may then use the location of that tile within the matrix to determine a location to begin to fit a next, lowest ordered, remaining tile. As an example, the location of a first tile within the matrix may be used to define the location where a second tile may be fit within the matrix.

As discussed above, the plurality of tiles may be of two or more sizes. The varying sizes of tiles may result in completed matrices containing one or more empty locations as illustrated in FIG. 1. As these empty locations may negatively affect the user experience, these empty locations may be backfilled.

A non-zero, positive, integer offset value (F) may indicate the extent to which tiles may be backfilled. A higher offset value allows more extreme backfilling than a lower offset value. In the illustrated example, an offset value of 3 is used. As such, a tile may be fit at most three columns to the left of the immediately previous tile. In the event the offset value exceeds the left-most boundary of the matrix, the method may begin fitting a tile in the uppermost row of the leftmost column.

As introduced above, each tile is fit into a first open location as constrained by the non-zero, positive integer offset value. A first open location may be defined as a location within the two-dimensional matrix where the area of a tile fits completely within the boundaries of the matrix and no other tile is located within the area of the tile being fit. In FIGS. 2A-2D, a bold rectangle is used to graphically represent the space that is being considered for fitting the tile.

Figure 2A:
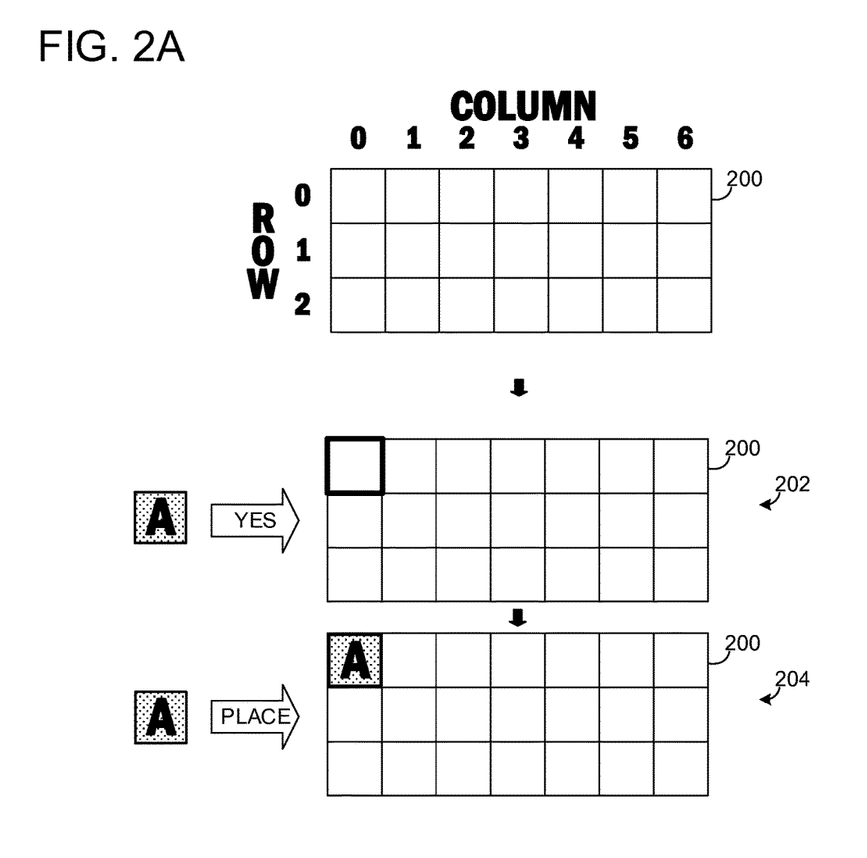
FIGS. 2A, 2B, 2C, and 2D schematically show fitting a plurality of ordered tiles in a horizontally scrollable two-dimensional matrix in accordance with an embodiment of the present disclosure.

FIG. 2A illustrates the fitting and placing of a first Tile A within a horizontally scrollable two-dimensional matrix 200. Tile A is one column wide by one row high (i.e., 1 w×1 h). As shown at 202, matrix 200 is empty prior to placing Tile A. As such, Tile A fits at Row 0, Column 0 of matrix 200. As shown at 204, Tile A is placed in this location.

Figure 2B:
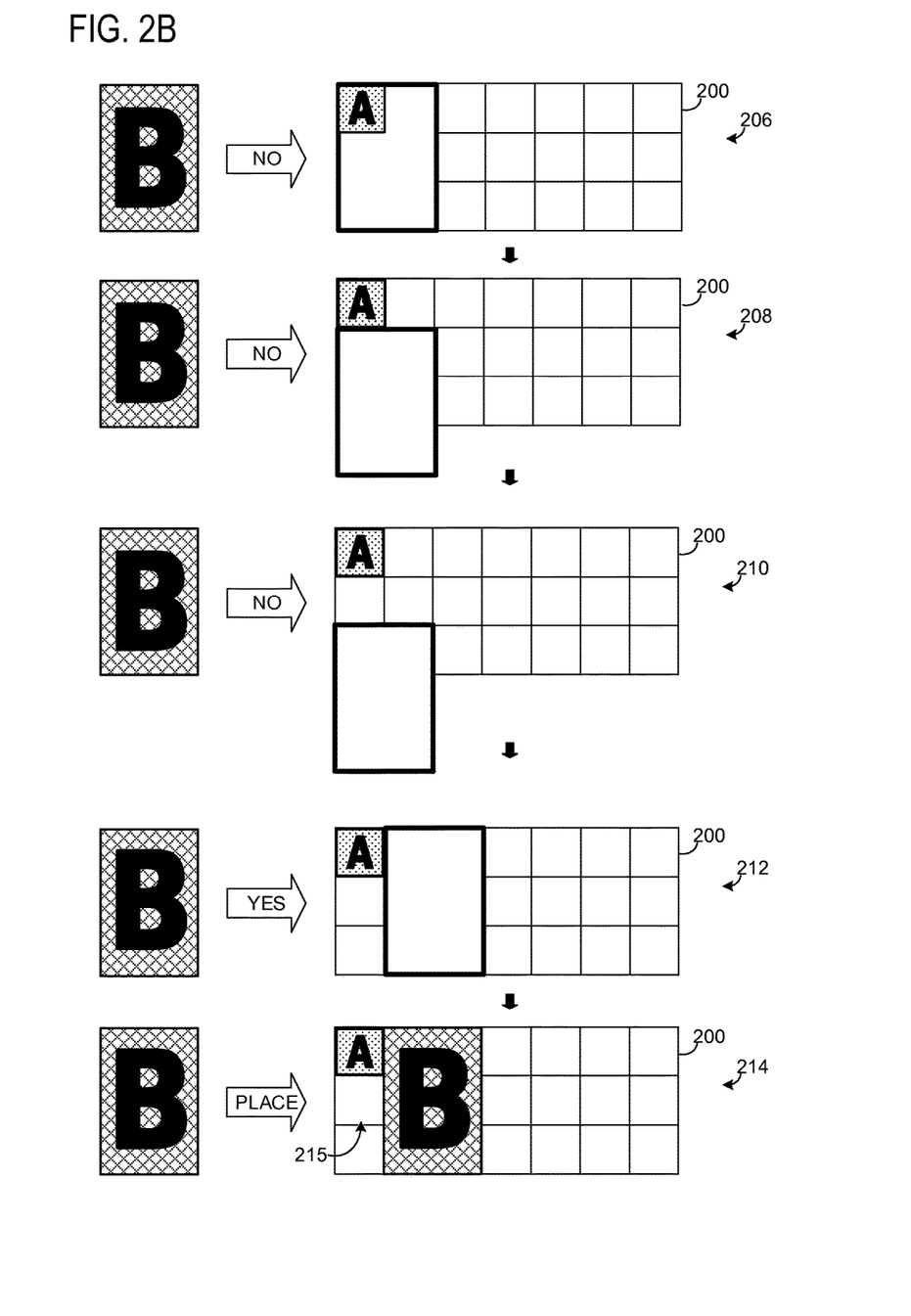

As shown in FIG. 2B, after Tile A is placed, the method continues by placing a next remaining tile from the plurality of ordered tiles (e.g., Tile B). In this example, Tile B is two columns wide by three columns high (i.e., 2 w×3 h).

As introduced above, Tile B and each successive tile is to be placed in a first open location in an uppermost row of a leftmost column beginning F columns to the left of a column in which the immediately preceding tile was placed.

Because Tile A was placed at Column 0 and the offset value is set to 3, the offset value exceeds the boundaries of the matrix (i.e., Column −3). As such, the fitting of Tile B may begin at Row 0, Column 0. The fitting of Tile B may increment down Column 0 until a location in a Row 2 is reached, as shown at 206, 208, and 210. However, none of the tested locations in Column 0 are open. At 206, Tile A occludes the tested location. At 208 and 210, the tested location exceeds the vertical boundaries of matrix 200.

Because a first open location is not found within Column 0, the fitting of Tile B proceeds to Row 0, Column 1, as shown at 212. Because this location is not occluded by another tile and is within the boundaries of matrix 200, Tile B is placed in the open location, as shown at 214.

The size of Tile B is such that the two rows beneath Tile A and to the left of tile B remain unfilled. As introduced above, this empty location 215 may be backfilled by subsequent tiles, even though such backfilling may deviate from the top-to-bottom, left-to-right ordering of the matrix.

Figure 2C:
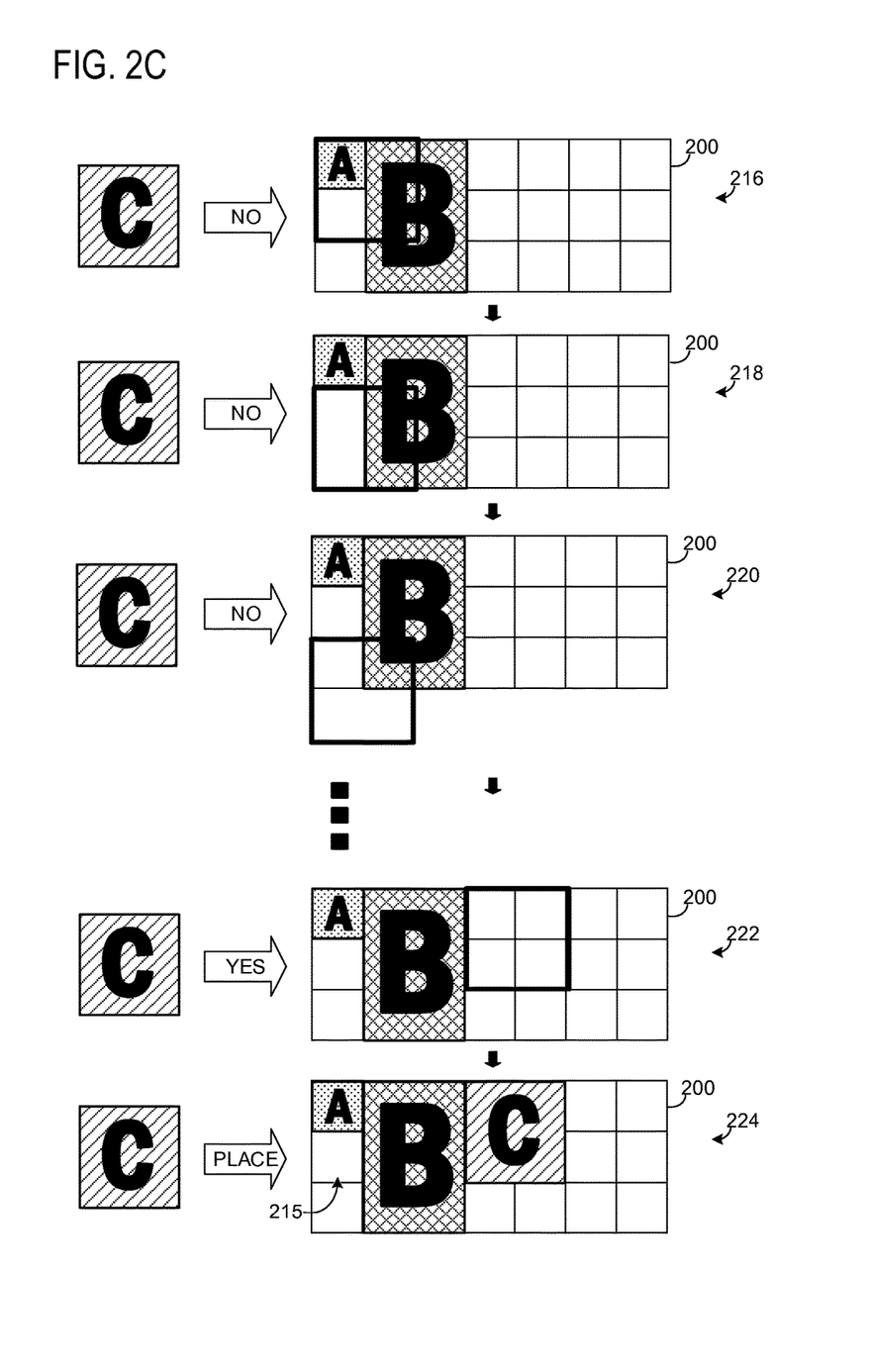

FIG. 2C illustrates the placing of a third ordered, 2 w×2 h Tile C. Because Tile B was placed at Column 1 and the offset value is set to 3, the offset value exceeds the boundaries of the matrix (i.e., Column −2). As such, the fitting of Tile C may begin at Row 0, Column 0, as shown at 216. The fitting of Tile C increments as shown at 216 (occluded by Tile A and Tile B), 218 (occluded by Tile B), and 220 (occluded by Tile B and exceeds vertical boundary of matrix 200). While each tested location is not illustrated, the fitting progresses until a first open location is located, as shown at 222. As shown at 224, Tile C is then placed in the open location at Row 0, Column 3. Although the offset value was of sufficient magnitude to allow the method to attempt to backfill empty location 215, Tile C is too large to fit empty location 215.

Figure 2D:
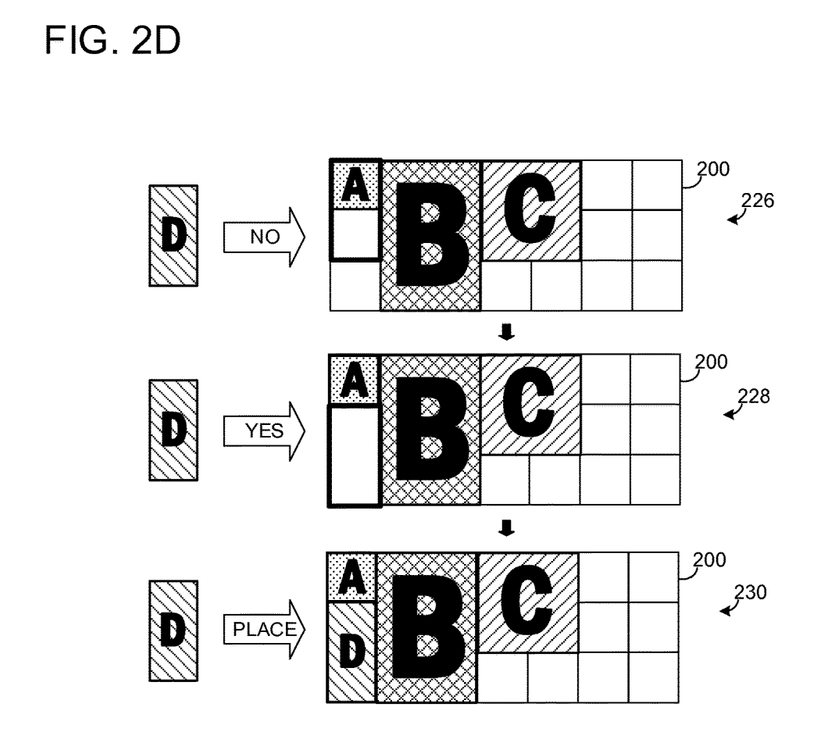

FIG. 2D illustrates the placing of a fourth ordered, 1 w×2 h Tile D. Because Tile C was placed at Column 3 and the offset value is set to 3, fitting of Tile C may begin at Row 0, Column 0, as shown at 226. The fitting of Tile D increments as shown at 226 (occluded by Tile A) until a first open location is located, as shown at 228. As shown at 230, Tile D is then placed in the open location at Row 1, Column 0. Thus, FIG. 2D illustrates a successful backfill of an empty location within a horizontally scrollable two-dimensional matrix.

It will be appreciated that Tile A is now followed by Tile D. Thus, the order of occurrence of the placed tiles within the matrix is A, D, B, C whereas the order of placement is A, B, C, D. This deviation may be quantified and used to evaluate the matrix to determine a preferred offset value.

Figure 3:
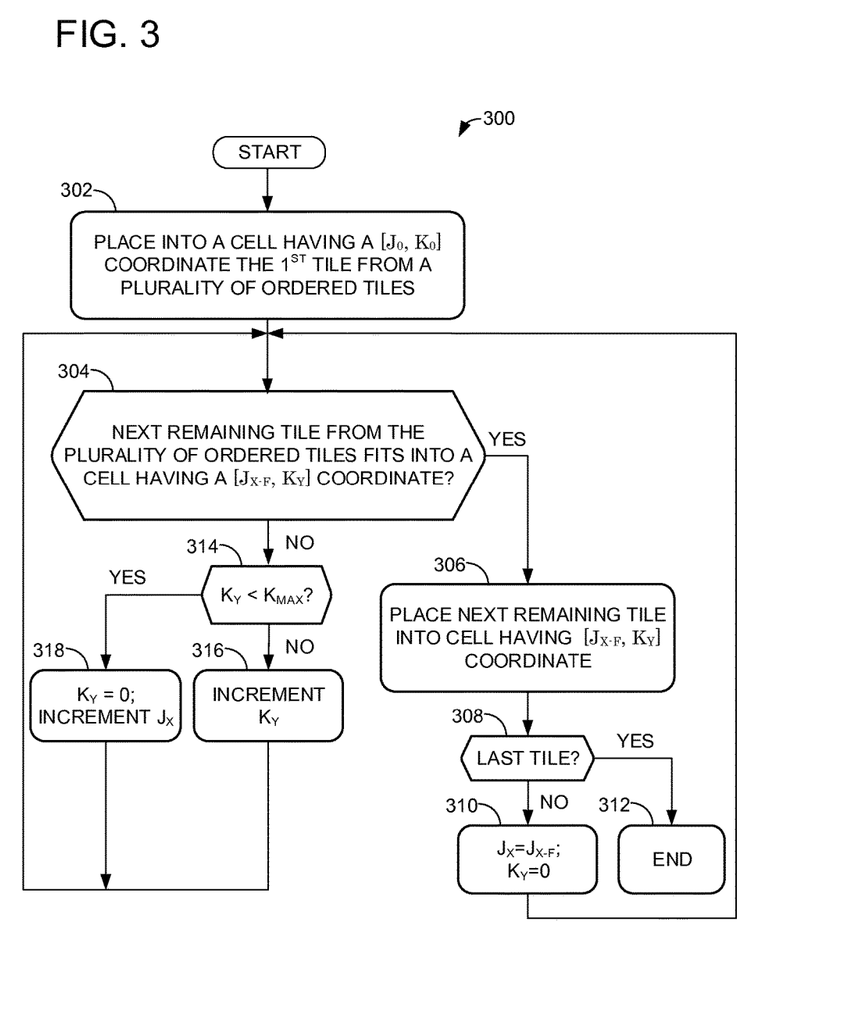
FIG. 3 shows a method of fitting a plurality of ordered tiles in a scrollable two-dimensional matrix in accordance with an embodiment of the present disclosure.

FIG. 3 shows a method 300 of fitting a plurality of ordered tiles in a scrollable two-dimensional matrix. The scrollable two-dimensional matrix may have a J dimension along a J axis and a K dimension along a K axis. The K axis may be orthogonal to the J axis. Furthermore, the two-dimensional matrix may be configured to scroll along one of either the J axis or K axis. For the purpose of discussing this non-limiting example, the J axis is a horizontal axis and the two-dimensional matrix may scroll along the J axis. However, it is to be understood that the J axis could instead be a vertical axis, and the two-dimensional matrix could alternatively scroll in the vertical direction.

The scrollable two-dimensional matrix may include a plurality of cells. Each of the plurality of cells may be defined by a J coordinate having a value from $J_0$ to $J_{max}$ (e.g., $J_0, J_1, J_2, \ldots J_{max}$) and a K coordinate having a value from $K_0$ to $K_{max}$ (e.g., $K_0, K_1, K_2, \ldots K_{max}$). Using the example of FIG. 2A, $[J_0, K_0]$ is the beginning cell, and $[J_6, K_2]$ is the ending cell (i.e., $[J_{max}, K_{max}]$). It will be appreciated that each cell may be defined by a pair of coordinates $[J_X, K_Y]$, where $J_0 \leq J_X \leq J_{max}$ and $K_0 \leq K_Y \leq K_{max}$.

The plurality of ordered tiles may have two or more different sizes. Furthermore, each tile may be sized to fit one or more contiguous cells of the matrix.

At 302, method 300 includes placing into a cell having a $[J_0, K_0]$ coordinate the first tile from a plurality of ordered tiles (i.e., Tile 1).

At 304, method 300 includes determining if the second tile and every subsequent tile from the plurality of ordered tiles fits into a cell having a $[J_{X-F}, K_Y]$ coordinate, where $K_Y$ begins at $K_0$, $J_X$ begins with the J coordinate of the previously placed tile, and F is the non-zero, positive integer offset value.

In this example, if the previously placed $n^{th}$ tile is the first tile, the $n+1^{th}$ tile would be the second tile. Further, the $n+1^{th}$ tile would be evaluated for fitting into a cell with a J coordinate of 0-3, or −3. However, this J coordinate is outside of the boundaries of the two-dimensional matrix. As such, method 300 may iterate through the out-of-bounds cells, or the fitting algorithm may begin fitting the n+1$^{th}$ tile at cell [0, 0].

If the n+1$^{th}$ tile fits in cell [$J_{X-F}$, $K_Y$], method 300 proceeds to 306 where this tile is placed into cell [$J_{X-F}$, $K_Y$]. After the tile is placed at 306, method 300 proceeds to 308. At 308, method 300 includes checking for any remaining tiles of the plurality of ordered tiles. If the last tile has been placed, method 300 proceeds to 312 and ends. If there are remaining tiles, method 300 proceeds to 310.

At 310, method 300 includes setting $J_X$ to $J_{X-F}$, and $K_Y$ to 0 before returning to 304, where the next tile is considered.

If the n+1$^{th}$ tile does not fit in cell [$J_{X-F}$, $K_Y$] at 304, method 300 proceeds to 314. At 314, method 300 includes checking if the $K_Y$ coordinate of the cell [$J_{X-F}$, $K_Y$] is less than $K_{max}$. If the $K_Y$ coordinate is less than $K_{max}$, method 300 may proceed to 316 which includes incrementing $K_Y$ by one cell and returning to 304. If $K_Y$ coordinate is not less than $K_{max}$, method 300 may proceed to 318 which includes setting $K_Y$ to 0 and incrementing $J_X$ by one before returning to 304.

It will be appreciated that the fitting algorithm will repeat this logic until a first fitting cell is located for the n+1$^{th}$ tile. It will also be appreciated that the fitting algorithm also may sequentially place each subsequent tile in a same manner as the n+1$^{th}$ tile until the highest ordered tile is placed.

Figure 4:
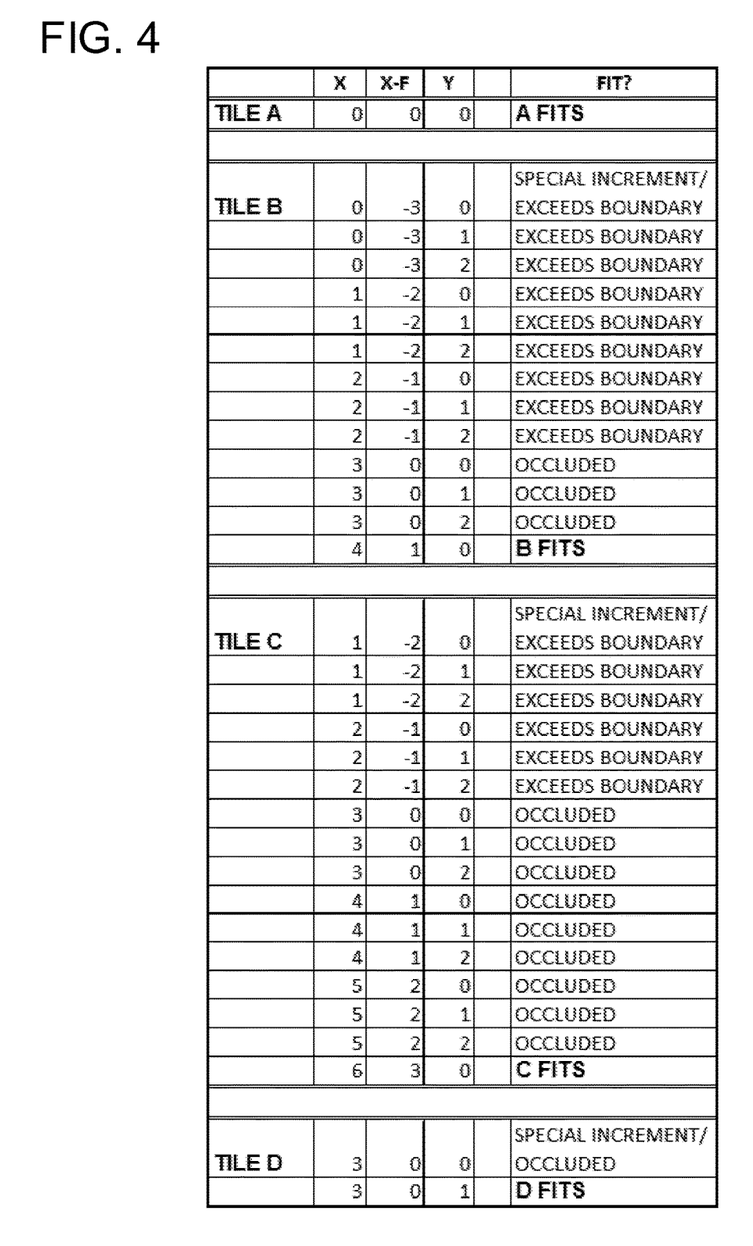
FIG. 4 shows a tabular representation of a method of fitting a plurality of ordered tiles in a scrollable two-dimensional matrix in accordance with an embodiment of the present disclosure.

FIG. 4 shows a tabular representation of the fitting algorithm described in method 300. For the purpose of this example, the plurality of ordered tiles will include Tiles A, B, C, and D of FIGS. 2A-D. For each ordered Tile A, B, C, and D, values for $J_X$, $J_{X-F}$, and $K_Y$ are provided in a respective column X, X-F, and Y. FIG. 4 also shows the values for each increment of $K_Y$ and $J_X$ during the fitting of each tile. The fit column denotes whether a tile fits, if any portion of the tile area exceeds the boundaries of the two-dimensional matrix, and/or if any portion of the tile area is occluded by a previously placed tile. Additionally, after each tile is placed, the fit column indicates the initialization of $J_X$ to $J_{X-F}$, and $K_Y$ to 0 as described with reference to 310 of method 300 in FIG. 3.

It is to be understood that the above-described methods and fitting algorithms may be optimized (e.g., to avoid testing out of bounds cells, to test two or more spaces in parallel, etc.).

Another optimization of the methods described above includes dynamically varying the offset value (F) for different pluralities of ordered tiles. For example, for any particular plurality of ordered tiles, an F value may be selected to minimize a number of empty cells or locations within the matrix while keeping a deviation in an ordering of the tiles below a threshold. Alternatively, the offset value may be selected to minimize order deviation of placed tiles while keeping a number and/or placement of empty cells below a threshold. It will be appreciated that any change to the properties of the two-dimensional scrolling matrix and/or properties of a plurality of ordered tiles placed within the matrix may require optimization of the offset value prior to generating a matrix of placed tiles incorporating the changes.

Optimization of the offset value may include performing one or more repetitions of the placement of the same plurality of ordered tiles with different offset values. Each matrix of placed tiles may then be evaluated based on one or more suitable criteria. The evaluations may then be compared to determine the optimal offset value.

Evaluation of a matrix of placed tiles may include quantifying the number of empty spaces within the two-dimensional matrix. As a non-limiting example, a matrix with fewer empty spaces may be evaluated more favorably than a matrix with more empty spaces. Evaluation of a matrix may further include locating each of the empty spaces within the two-dimensional matrix. The evaluation of the location of each empty space may be weighted to favor offset values that maintain uninterrupted edges along one or more boundaries of the two-dimensional matrix, for example. As another example, the evaluation may favor fittings that limit the number of contiguous empty spaces.

The evaluation may also include quantifying a deviation of the ordering of placed tiles within the matrix. Recalling FIG. 2D, the conservation of the order of Tiles A, B, C, and D was deviated from in the placement of Tile D in the location below Tile A. An optimization may limit the number and/or percentage of such deviations.

It will be appreciated that a deviation of an ordering of tiles within the matrix occurs due to the use of the offset value to backfill empty spaces. For example, a large offset value may result in a matrix with few if any empty spaces. However, the large offset value may result in a large deviation of the order of the tiles within the matrix. Thus, an optimal offset value may be selected to balance the number of empty spaces and any deviation in the ordering of placed tiles within the matrix. It will be further appreciated that additional suitable criteria may also be used to determine an optimized offset value.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
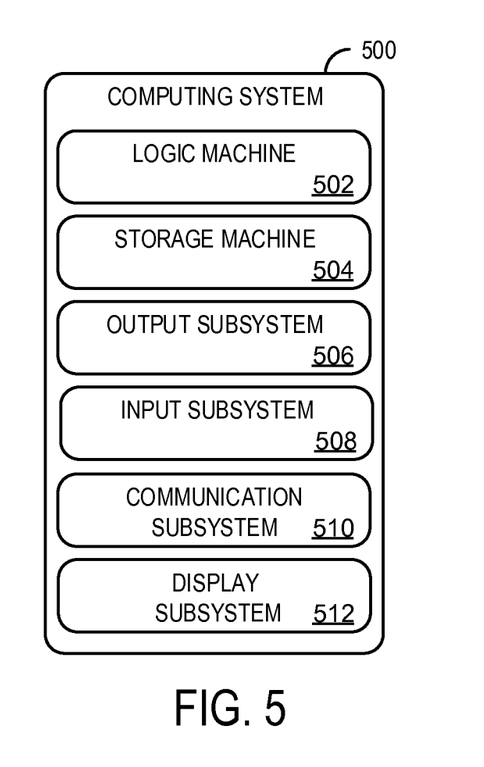
FIG. 5 schematically shows a computing system in accordance with an embodiment of the present disclosure.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 512, output subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 512 may be used to present a visual representation of data held by storage machine 504. This visual representation may take the form of a graphical user interface (GUI). As the herein described methods and processes change the data held by the storage machine, and thus transform the state of the storage machine, the state of display subsystem 512 may likewise be transformed to visually represent changes in the underlying data. Display subsystem 512 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of displaying a plurality of ordered tiles in a graphical user interface (GUI) including a horizontally scrollable two-dimensional matrix having a plurality of columns and a plurality of rows, the plurality of ordered tiles having two or more different sizes, the method comprising:
    displaying in the GUI via a display device, a lowest ordered tile of the plurality of ordered tiles, wherein the lowest ordered tile is selectable in the GUI to provide access to a computing object;
    recognizing a constant F, where F is a non-zero, positive integer offset value less than a number of the plurality of columns; and
    for each next remaining tile of the plurality of ordered tiles, in order beginning with a lowest ordered remaining tile and ending with a last tile fitting in the GUI, displaying the next remaining tile in a first open location in an uppermost row of a leftmost column at most the constant F columns to the left of a column in which an ordered tile having one lower rank is displayed.

2. The method of claim 1, wherein the constant F is dynamically recognized for different pluralities of ordered tiles.

3. The method of claim 1, wherein the constant F is selected to minimize a number of empty locations within the matrix while keeping a deviation in an ordering of the tiles below a threshold.

4. The method of claim 1, wherein the constant F is selected to minimize order deviation of displayed tiles while keeping a number and/or placement of empty locations below a threshold.

5. The method of claim 1, wherein a size of each of the plurality of ordered tiles is proportional to a frequency of use.

6. The method of claim 1, wherein an order of the plurality of ordered tiles is proportional to a frequency of use.

7. The method of claim 1, wherein an order of the plurality of ordered tiles is chronological.

8. The method of claim 1, wherein each tile of the plurality of tiles is selectable in the GUI to provide access to a tile-specific computing object.

9. A method of displaying a plurality of ordered tiles in a graphical user interface (GUI) including a scrollable two-dimensional matrix, the scrollable two-dimensional matrix including a plurality of cells, each cell defined by a J coordinate having a value from $J_0$ to $J_{max}$ and a K coordinate having a value from $K_0$ to $K_{max}$, the plurality of ordered tiles having two or more different sizes, each sized to fit one or more contiguous cells of the matrix, the method comprising:
  recognizing a constant F, where F is a non-zero, positive integer offset value less than $J_{max}$;
  displaying, via a display device, the GUI including an $n^{th}$ tile remaining from the plurality of ordered tiles in a cell having a [$J_X$, $K_Y$] coordinate in the two-dimensional matrix wherein the $n^{th}$ ordered tile is selectable in the GUI to provide access to a computing object; and
  for each next tile of the plurality of ordered tiles beginning with an $n+1^{th}$ tile and ending with a highest ordered tile fitting in the GUI,
  displaying, via the display device, the GUI including the next tile in a first fitting cell beginning with a cell having a [$J_{X-F}$, $K_0$] coordinate in the two-dimensional matrix and progressing through each cell by incrementing from $K_0$ to $K_{max}$ for each J coordinate before positively incrementing the J coordinate.

10. The method of claim 9, wherein the two-dimensional matrix scrolls on the display along a J coordinate axis.

11. The method of claim 10, wherein the J coordinate axis is a horizontal axis.

12. The method of claim 10, wherein the J coordinate axis is a vertical axis.

13. The method of claim 9, wherein the constant F is dynamically recognized for different pluralities of ordered tiles.

14. The method of claim 9, wherein the constant F is selected to minimize a number of empty cells within the matrix while keeping a deviation in an ordering of the tiles below a threshold.

15. The method of claim 9, wherein the constant F is selected to minimize order deviation of displayed tiles while keeping a number and/or placement of empty cells below a threshold.

16. The method of claim 9, wherein a size of each of the plurality of ordered tiles is proportional to a frequency of use.

17. The method of claim 9, wherein an order of the plurality of ordered tiles is based on a frequency of use.

18. The method of claim 9, wherein an order of the plurality of ordered tiles is chronological.

19. A method of displaying a plurality of ordered tiles in a graphical user interface (GUI) including a vertically scrollable two-dimensional matrix having a plurality of columns and a plurality of rows, the plurality of ordered tiles having two or more different sizes, the method comprising:
  displaying in the GUI via a display device, a lowest ordered tile of the plurality of ordered tiles, wherein the lowest ordered tile is selectable in the GUI to provide access to a computing object;
  recognizing a constant F, wherein F is a non-zero, positive integer offset less than a number of the plurality of columns, and wherein F is selected to minimize a number of empty locations within the two-dimensional matrix while keeping a deviation in an ordering of the tiles below a threshold; and
  for each next remaining tile of the plurality of ordered tiles, in order beginning with a lowest ordered remaining tile and ending with a last tile fitting in the GUI, displaying the next remaining tile in a first open location in a leftmost column of an uppermost row at most the constant F rows above a row in which an ordered tile having one lower rank is displayed.

20. The method of claim 19, wherein the constant F is selected to minimize order deviation of displayed tiles while keeping a number and/or placement of empty locations below a threshold.

* * * * *